US008707943B2

(12) United States Patent
Berglund et al.

(10) Patent No.: US 8,707,943 B2
(45) Date of Patent: Apr. 29, 2014

(54) SAW DRIVE ARRANGEMENT

(75) Inventors: Björn Berglund, Leksand (SE); Magnus Hammar, Falun (SE)

(73) Assignee: Sagningsteknik I Leksand AB, Leksand (SE)

(*) Notice: Subject to any disclaimer, the term of this patent is extended or adjusted under 35 U.S.C. 154(b) by 456 days.

(21) Appl. No.: 13/119,369

(22) PCT Filed: Sep. 17, 2009

(86) PCT No.: PCT/SE2009/000414
§ 371 (c)(1),
(2), (4) Date: Jul. 6, 2011

(87) PCT Pub. No.: WO2010/033063
PCT Pub. Date: Mar. 25, 2010

(65) Prior Publication Data

US 2011/0253122 A1 Oct. 20, 2011

(30) Foreign Application Priority Data

Sep. 17, 2008 (SE) ........................................ 0801987

(51) Int. Cl.
*B28D 1/08* (2006.01)
*B23D 61/18* (2006.01)

(52) U.S. Cl.
USPC .................................. 125/21; 30/381; 30/383

(58) Field of Classification Search
USPC ........ 125/21, 22; 30/381, 383, 384, 385, 386; 476/65, 66
See application file for complete search history.

(56) References Cited

U.S. PATENT DOCUMENTS

| | | | | | |
|---|---|---|---|---|---|
| 1,667,347 | A | * | 4/1928 | Field | 144/73 |
| 2,184,461 | A | * | 12/1939 | Mall | 30/385 |
| 2,610,657 | A | * | 9/1952 | Kiekhaefer | 30/383 |
| 2,675,835 | A | * | 4/1954 | Kiekhaefer | 30/383 |
| 3,498,346 | A | * | 3/1970 | Ehlen et al. | 30/381 |
| 3,530,909 | A | * | 9/1970 | Scharpf | 30/381 |
| 4,282,958 | A | * | 8/1981 | Zindler | 192/17 R |
| 4,683,659 | A | * | 8/1987 | Wunsch et al. | 30/381 |
| 5,303,477 | A | * | 4/1994 | Kuzarov | 30/384 |
| 5,353,506 | A | * | 10/1994 | Muller et al. | 30/386 |

FOREIGN PATENT DOCUMENTS

| | | |
|---|---|---|
| FR | 2 674 173 A1 | 9/1992 |
| IT | 1180403 | 9/1987 |
| SU | 691307 | 10/1979 |

* cited by examiner

*Primary Examiner* — Lee D Wilson
*Assistant Examiner* — Tyrone V Hall, Jr.
(74) *Attorney, Agent, or Firm* — Birch, Stewart, Kolasch & Birch, LLP

(57) ABSTRACT

Saws (1) for cutting or sawing harder materials, such as concrete, concrete structures, brick and stone, have an endless cutting member (4) that is driven through a transmission assembly (11, 20) being supported in the saw and having a drive member and that is guidingly supported on a cutting member supporting portion (3). In such a saw a clamping member is provided that for providing a friction drive contact between the drive member, the clamping member and the cutting member is biased in a direction towards the drive member with driven parts (7) of the cutting member introduced there between, whereby an essentially reduced load on the actual saw, its parts and the cutting member is obtained as well as an improved functionality in the form of an increased flexibility and safety during operation of the saw. The invention also relates to a transmission assembly as well as a cutting member for such a saw.

25 Claims, 13 Drawing Sheets

II-II

VI-VI

FIG. 11A
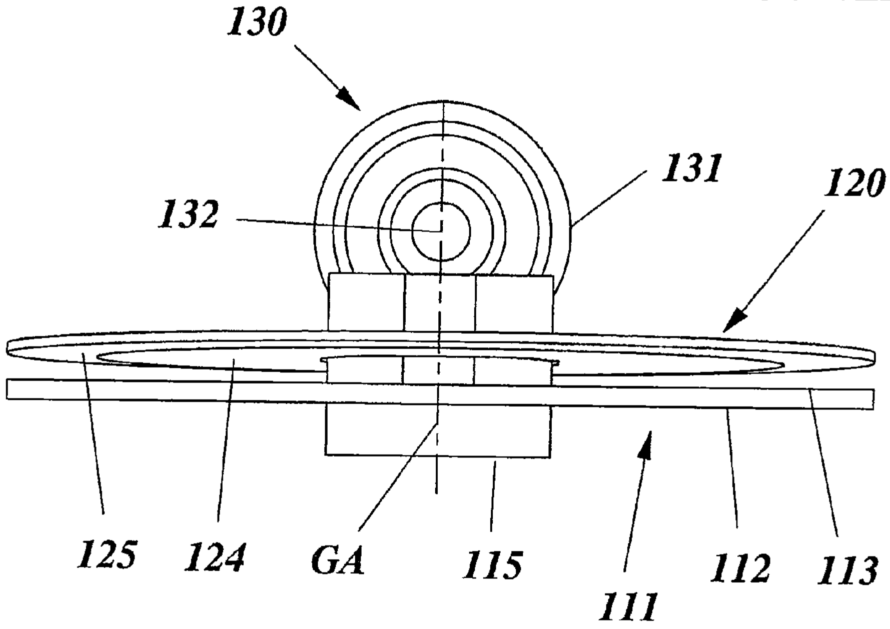
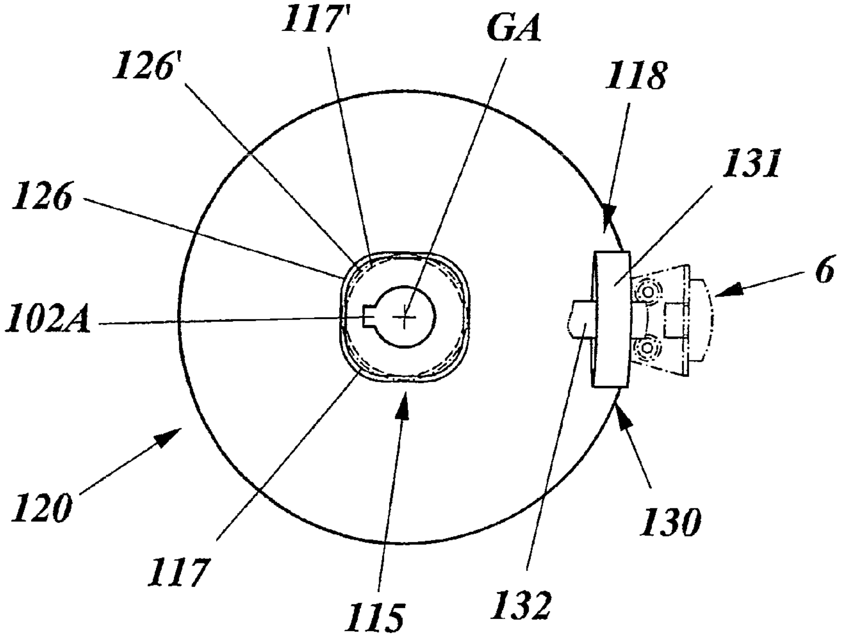
FIG. 11B

SAW DRIVE ARRANGEMENT

TECHNICAL FIELD

The present invention generally concerns the type of saw that has an elongate cutting member passed around a saw guide bar and drive means drivingly engaging the cutting member, and more specifically relates to a drive arrangement for such a saw.

BACKGROUND

Saws for cutting harder materials such as concrete, brick or stone are available in different types and in different configurations. Such saws are available both as saws supported on a frame and as handheld or portable saws. These general types of saws are available both as circular saws using circular hard metal or diamond blades, as chain saws having a traditional type of saw chain of metal links on which diamond equipped cutting segments are supported and as wire saws using a wire or cable that runs unsupported between support wheels and that at regular distances carries cutting elements. Of the known saws, the circular saws in general have a restricted cutting depth and, e.g. when employed for forming an opening in concrete, produce a normally unacceptable, considerable excessive cutting or sawing. Chain saws having a saw chain of interconnected metal links do on their side involve a high cutting element cost. Due to their design the wire saws are in principle only possible to use for unsupported or “floating” cutting, i.e. without any underlying guide in the form of a guide bar or the like. Furthermore, it is virtually impossible to replace individual worn out cutting elements on the saw wire, which leads to a relatively high operating cost.

Our own WO 98/32578 describes a new type of saw for cutting harder materials. According to this document, a wire saw is briefly combined with a guide bar that resembles the guide bar of a power chain saw and a cutting member is employed that is intended for use in handheld or portable concrete saws and that has cutting element carriers being “floatingly” supported on a steel wire, i.e. supported for restricted axial movement. This new type of saw has several advantages when compared to the traditional saws. To sum up, these advantages consist in that it is possible to successfully combine the continuous cutting element carrier support of the chain saws with the more flexible and cheaper cutting members of the wire saws. With the illustrated cutting member design the operating cost may also be significantly lowered due to the fact that the “floatingly” supported cutting element carriers may be replaced relatively easily when individual of them are damaged. Although the described, by us developed cutting/sawing equipment has resulted in significant improvements in this technical field and is very attractive in many respects, general requests are made for functional improvements and measures for eliminating other weaknesses, above all from a durability and safety point of view, that exist by virtually all types of saws for the indicated areas of application.

SUMMARY

A general object of the present invention is to provide an improved saw for cutting hard materials, such as concrete and stone.

A specific object of the invention is to suggest a method of driving the cutting member of a saw for cutting harder materials, which provides improved durability and function for the saw in its entirety as well as specifically also for the cutting member.

Another object of the invention is to provide a saw for cutting harder materials, which has a drive assembly affording the above mentioned improved durability and function.

Further objects of the invention are to suggest an improved drive arrangement for a saw for cutting harder materials, as well as an improved cutting member for cooperation with said drive arrangement to provide improved drive conditions for the saw, both with regard to its useful life and to its efficiency.

These and other objects are met by the invention as defined by the accompanying patent claims.

The invention relates generally to saws for cutting or sawing the type of hard materials that include concrete, concrete structures, brick and stone and having an endless cutting member driven by a transmission assembly being connected to a drive motor and engaging and being supported by a cutting member supporting portion of the saw. For attaining the indicated objects the invention provides a method and a saw of said type where at least one clamping member is employed, which for establishing a friction drive contact between the clamping member, a drive member and the cutting member is biased towards the drive member with driven parts of the cutting member introduced there between. In this way is achieved significantly reduced load on the saw and thus improved durability of the saw and its parts, especially the cutting member and the transmission assembly, as well as improved functionality in the form of increased flexibility of manufacture and improved saw operation safety.

In an embodiment that may be especially preferable for practical reasons and for reasons of manufacture, the invention suggests that clamping member and drive member are provided substantially centered on a common geometrical axis, that the first-mentioned is supported for axial and tiltable movement relative to the drive member and that a biasing force is applied thereto.

In an embodiment that is especially suitable with regard to manufacturing and component cost, biasing force is applied to the clamping member by a biasing roller at a transmission assembly contact area. Thereby, the clamping member is preferably tilted by forming, at a radially outer edge thereof, a drive surface that is angled away from the drive member and where the biasing force is applied.

In an alternative embodiment the biasing force is applied to the clamping member by biasing means and substantially evenly distributed around drive member and clamping member.

In other embodiments of the invention the drive force from the saw drive motor may be transmitted either to the biasing roller or to the drive member and then, through the biasing force, to the cutting member.

In yet another embodiment, a relieving force is applied against a portion of the clamping member tilting the clamping member relative to the drive member so that contact between said members is concentrated to a contact area of the transmission assembly of the saw that is remote from the relieving force application area.

According to another aspect of the invention a transmission assembly is suggested for creating the inventive friction drive contact between the parts of the saw of the invention, whereby the drive member of the saw has a disc shape with flat sides and an even peripheral surface and the clamping member, which is biased against the drive member, likewise has a disc shape with a flat side and whereby biasing means are provided that have a direction of action of their biasing force that corresponds to or alternatively forms an angle with a normal to flat sides of the drive member.

According to yet another aspect of the invention a cutting member is suggested that is adapted for use in the drive arrangement of the invention and that has cutting element carriers with support members for direct supporting contact with the cutting member supporting portion of the saw and rider members having portions for guidingly contacting the cutting member supporting portion and provided at a distance apart that is slightly larger than the width of the cutting member supporting portion of the saw as well as of the transmission assembly drive member.

SHORT DESCRIPTION OF THE DRAWINGS

The invention and further objects and advantages thereof, in addition to those described above, will be best understood by referring to the following description of embodiments of the invention taken together with the accompanying drawings, in which:

FIG. 11A is an end view of the drive transmission, as seen from the cutting member supporting portion of the saw;

FIG. 11B is a side view of the drive transmission of FIGS. 8 and 9, as seen from the side of the clamping member;

DETAILED DESCRIPTION

The invention will be described in greater detail below, with reference to embodiments thereof that are illustrated in the accompanying drawing FIGS. 1-13. The illustrated, exemplifying embodiments of the invention refer to an application of the basic concept of the invention in particular to a very schematically illustrated saw design that is primarily intended for cutting concrete, stone and other harder materials. This embodiment shall in no way restrict the invention to the specifically illustrated application or to the specific saw type or design or to any other details that are not vital to the basic concept or principles of the invention. Examples of variations and modifications of the illustrated embodiment are given further below.

Figure 14:
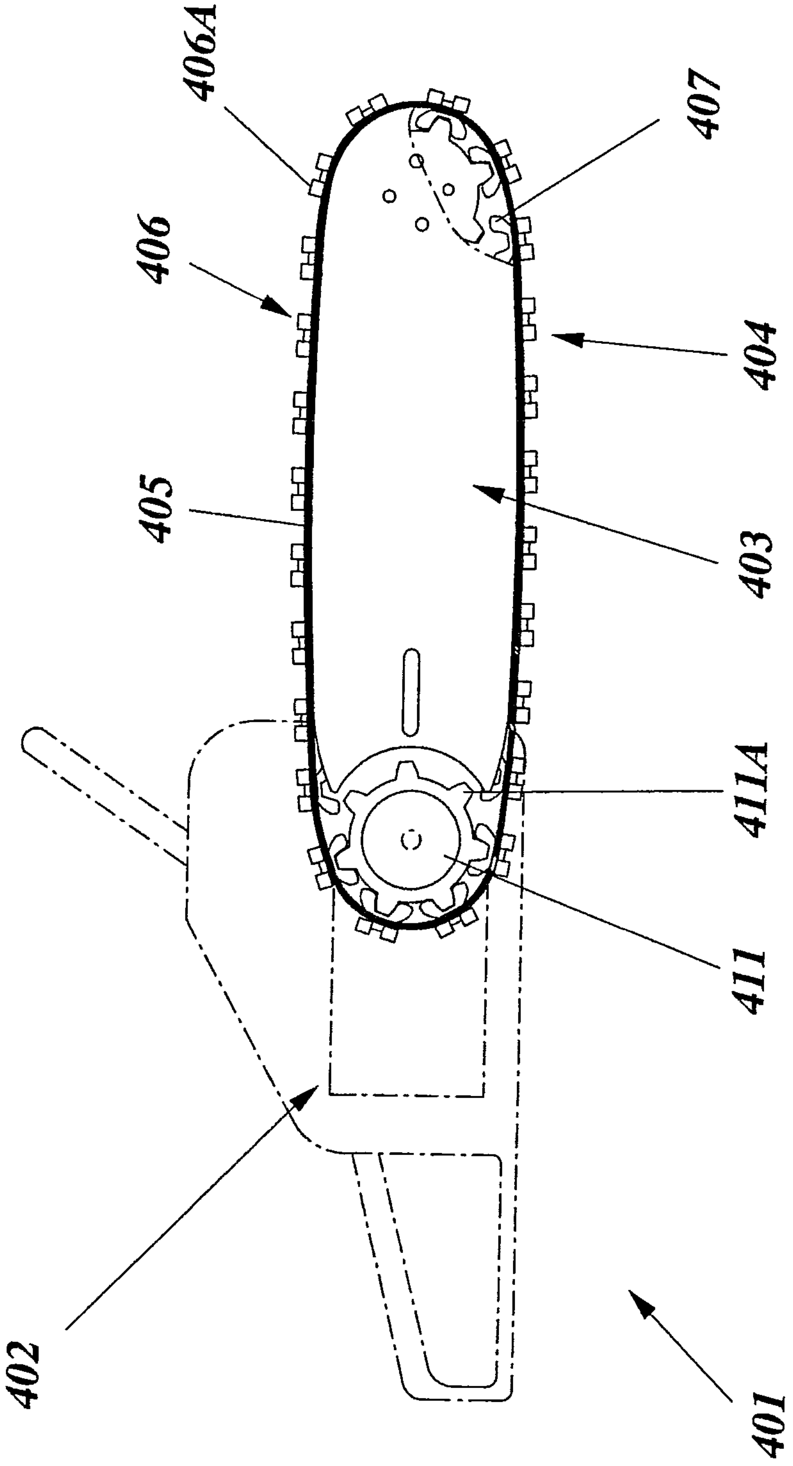
FIG. 14 is a very schematical illustration of a known concrete saw of the general type with which the present invention is primarily adapted to be used.

FIG. 14 shows an example of a schematically outlined concrete saw 401 having a cutting member 404 extended around a guide bar 403 and being of a type that is previously known from our above mentioned WO 98/32578. The cutting member 404 consists of cutting element carriers 406 that are floatingly supported on a steel wire 405. The cutting element carriers have cutting elements 406A firmly attached thereto and have riders 407 connected thereto. Driver members (not specifically shown) are rigidly attached, at regular distances, to the steel wire 405 of the cutting member 404. Said driver members are received in recesses in the respective, axially freely movably supported cutting element carriers 406 to secure them axially. In this known type of saw the transfer of drive force from a drive motor 402 to the cutting element carriers 406 is basically performed in the conventional manner known from chain saws. In particular, the riders 407 of the cutting element carriers guide the cutting member 404 around the guide bar 403 and have a lower outline or contour that is adapted to establish drive contact with a drive member 411 that is rotatably journalled in the saw. The drive member 411 is connected to an output shaft (not shown) of the drive motor 402 of the saw, so as to be fixed for rotation therewith. At its outer periphery it is provided with evenly separated teeth 411A between which the cutting member 404 riders 407 are introduced for transferring drive force from the motor 402 to the cutting member 404. With such a conventional type of drive transmission secure and fundamentally slip-free transmission of the drive force is achieved. However, within the technical field in question, this type of drive system suffers from certain drawbacks. The drive system requires that the "floatingly" supported carriers 406 of the cutting member 404 and above all their cooperating driver members are provided at mutually equal distances, which increases the manufacturing/assembly cost of the cutting member. The fundamentally slip-free drive force transmission may also cause safety problems both with regard to overloading the drive components and cutting member of the saw and with regard to personal injuries when jamming the cutting member in the cut material with resulting kickback and/or disengagement of the cutting member.

In order to eliminate the described drawbacks and problems of known saws for cutting harder materials and their drive systems, respectively, the present invention suggests a new solution for the drive arrangement for such a saw and its object is to achieve a safe, comparatively wear-free and inexpensive solution for the drive force transmission from a drive motor to a cutting member. This is basically achieved by means of the solution according to the present invention, which briefly means that drive is transmitted from the motor to the cutting member through a friction drive. With such a solution one does above all achieve that the cutting member may be manufactured without having to observe an exact, fixed pitch between the cutting element carriers. In particular, the friction drive permits that the mutual distribution of the cutting element carriers along the cutting member will not have to be adapted to the toothing of a drive member of the saw, which simplifies and cheapens the manufacturing of drive components and cutting member and also involves heavily reduced load on the drive transmission and cutting member and thereby significantly reduced wear of these parts. Thereby, it will also be possible to reduce overload and other disadvantageous load peaks of the cutting member as well as other drive components. This in turn means that the durability and useful life of the saw may be markedly improved in comparison with the prior art.

Figure 1:
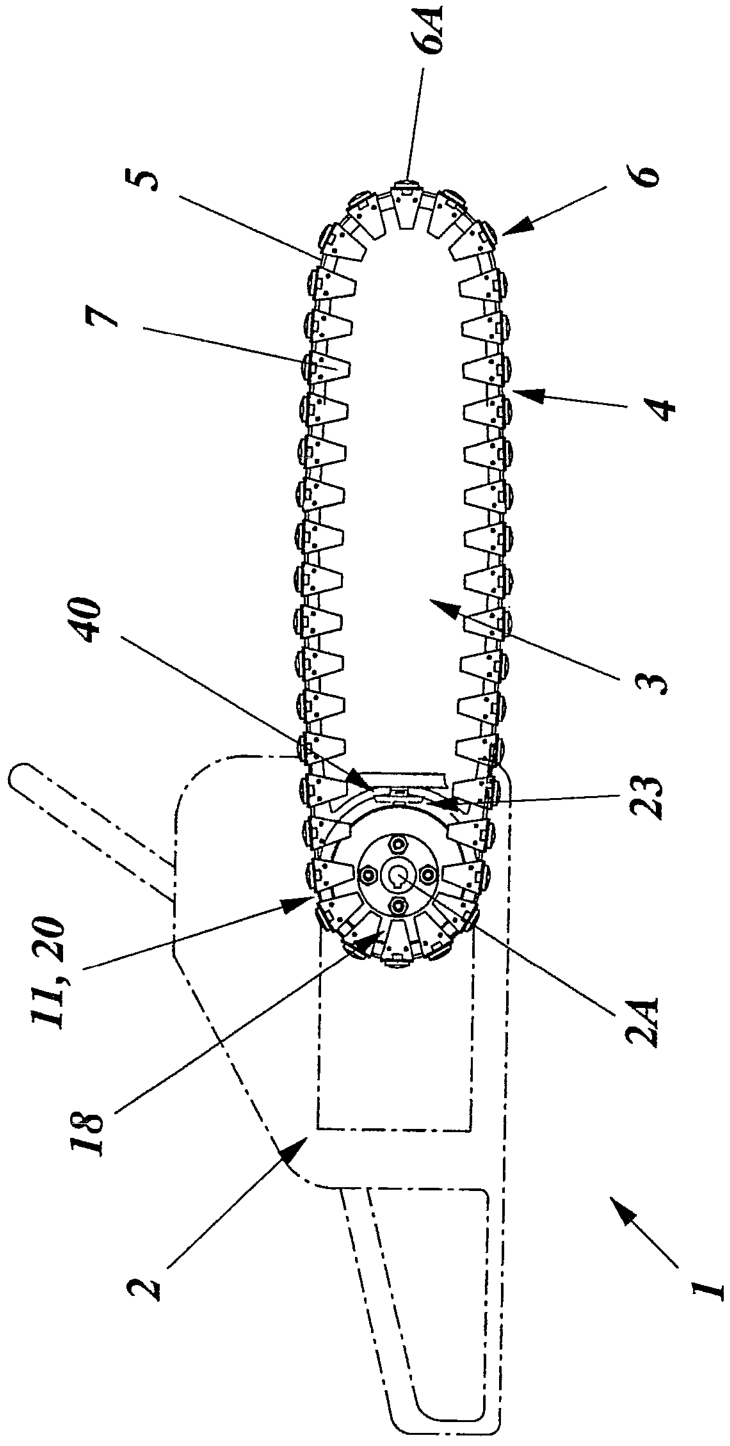
FIG. 1 is a very schematical illustration of a saw according to the present invention.
Figure 2:
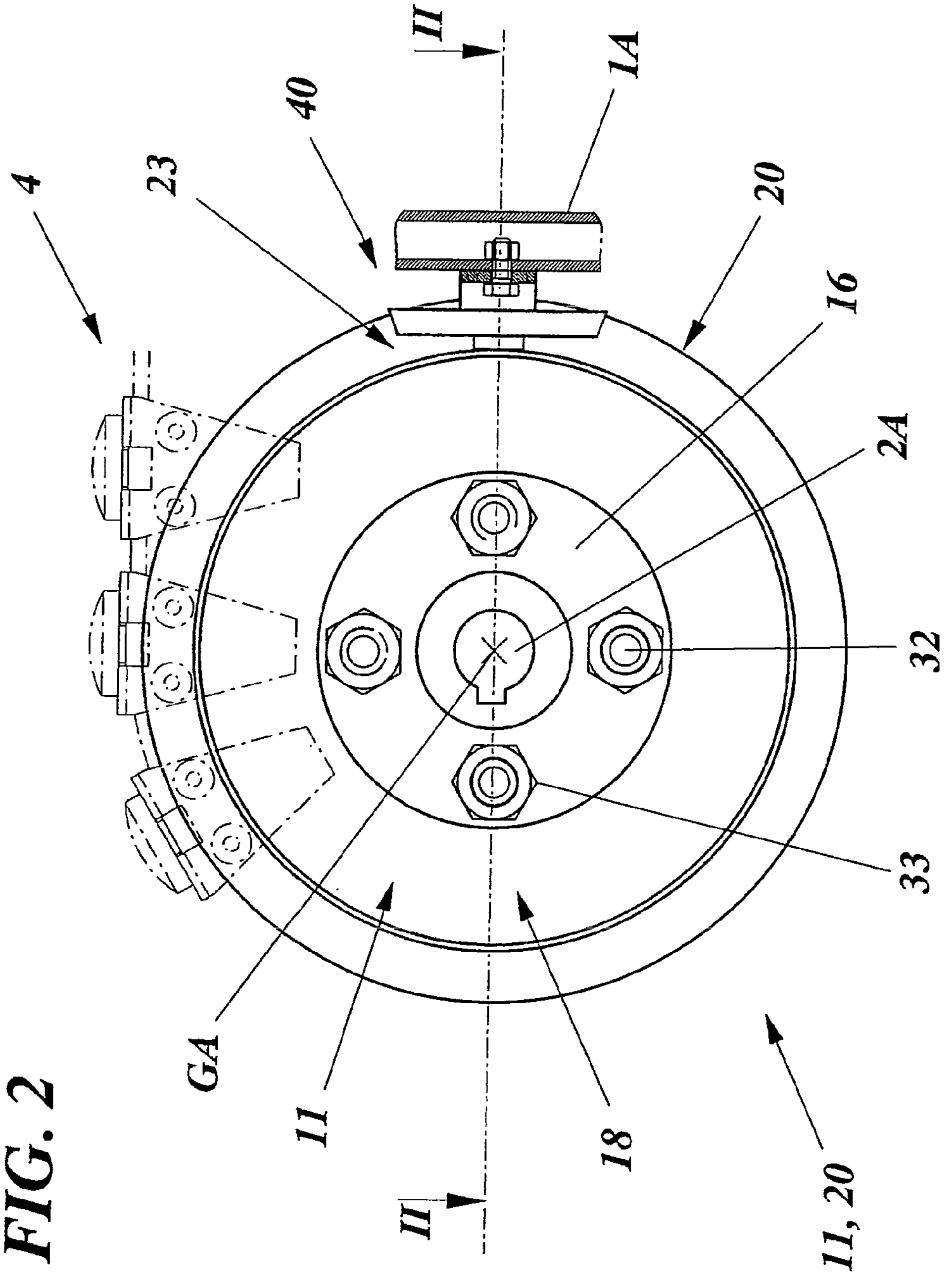
FIG. 2 is a partial side view showing details of the drive transmission of the saw of FIG. 1.

Initially, the invention will now be explained with reference to an exemplifying embodiment thereof that is illustrated in the drawing figures of the accompanying FIGS. 1-7. In FIG. 1 is shown a saw 1 that is primarily intended for cutting harder materials, such as stone and concrete etc., and that like the known saw according to FIG. 14 has a drive motor 2, a transmission assembly 11, 20 for transmitting drive force from the drive motor to a cutting member 4 and a cutting member supporting portion, especially in the form of a guide bar 3. The cutting member 4 has free ends that are interconnected for forming an endless unit and consists of an elongated support unit 5, here shown in the form of a wire, that "floatingly" supports cutting element carriers 6. The cutting element carriers 6 have cutting elements 6A connected thereto, guidingly engage the guide bar 3 of the saw and are axially secured to the cutting member 4 by means of driver members 4A that are firmly supported on the wire 5 (see FIGS. 6 and 7). Furthermore, the cutting element carriers 6 are, at least in the assembled condition, each firmly connected to a rider member 7 for the guiding contact with the saw guide bar 3. The transmission assembly 11, 20 has a drive member 11 having a general circular disc shape with opposite substantially flat sides 12, 13 and a non-profiled, substantially even outer peripheral surface 14 for the supporting contact with the cutting member 4. This is made possible by the friction drive that is provided by the invention and that is independent of any fixed pitch of the cutting member. In the embodiment shown here, the drive member 11 has a thickened portion 16 radially inwardly of the flat sides 12, 13, i.e. closest to its below described hub 15, for strengthening the drive member 11 in the area of the later described biasing means 30. The drive member 11 is furthermore stationary but rotatably journalled in the saw 1, like before by being connected to a drive shaft 2A from the drive motor 2 so as to be fixed for rotation therewith. The drive shaft 2A is appropriately accommodated and secured in a central opening 15A (see especially FIG. 5) in the hub. Thus, the drive member 11 is rotated by the drive shaft 2A and transmits drive force from the drive motor 2 to the cutting member 4 through the rider members 7 and in cooperation with the later described, at least one clamping member 20.

The invention is based on the solution that the transmission assembly 11, 20 comprises at least one clamping member 20 that is provided centered on a common geometrical axis GA with the drive member 11 and that in this embodiment is rotatable in the saw 1 by being coupled to the drive member 11 so as to be fixed for rotation therewith. The clamping member 20 likewise has a circular disc shape with one side 21 facing the drive member and having a substantially flat drive surface 24 and, in addition, preferably a radial outer surface 25 that in this design is outwardly angled or beveled with the angle $\alpha$ (illustrated very exaggerated in FIGS. 3, 4 and 13; in practice the angle is in the order of 1-5°, preferably 2-3°). The purpose thereof is explained below. In the illustrated embodiment the clamping member 20 of the transmission assembly is provided only at one side 13 of the drive member 11 (in an alternative design that will be described in connection with FIG. 13 one clamping member may be provided at each side of the drive member). Biasing means 30 act between the drive member 11 and the clamping member 20 and do apply a biasing force FK between the drive member 11 and the clamping member 20. Said biasing force FK is applied substantially evenly distributed around the drive member 11 and clamping member 20 for biasing at least portions thereof towards each other and towards portions of the rider members 7 that may be introduced there between. The biasing means 30 do in this case consist of springs 31, here four of them, that are substantially evenly distributed around the drive member 11 and that are passed onto schematically illustrated pins or bolts 32 that extend through the drive member 11. Said pins or bolts are firmly connected to the clamping member 20 or do alternatively, with a stop, engage a side 22 of the clamping member facing away from the drive member 11. The springs are outwardly locked in position by means of e.g. a nut 33. Thus, in this design, the biasing means 30 have a direction of action for their biasing force FK that is substantially perpendicular to the flat sides 12, 13 of the drive member 11. As was mentioned, the clamping member 20 is coupled rotationally fixed to the drive member 11 by the pins 32 that extend through corresponding holes 11A (FIG. 5) in the thickened portion 16 of the drive member 11, but is journalled for axial movement in a direction towards and away from as well as for tilting relative to the drive member 11 by the fact that the pins 32 are extended with a certain play through the holes 11A in the drive member 11. Thus, the biasing means 30 serve to pull the clamping member 20 in the direction towards the drive member 11.

Figure 3:
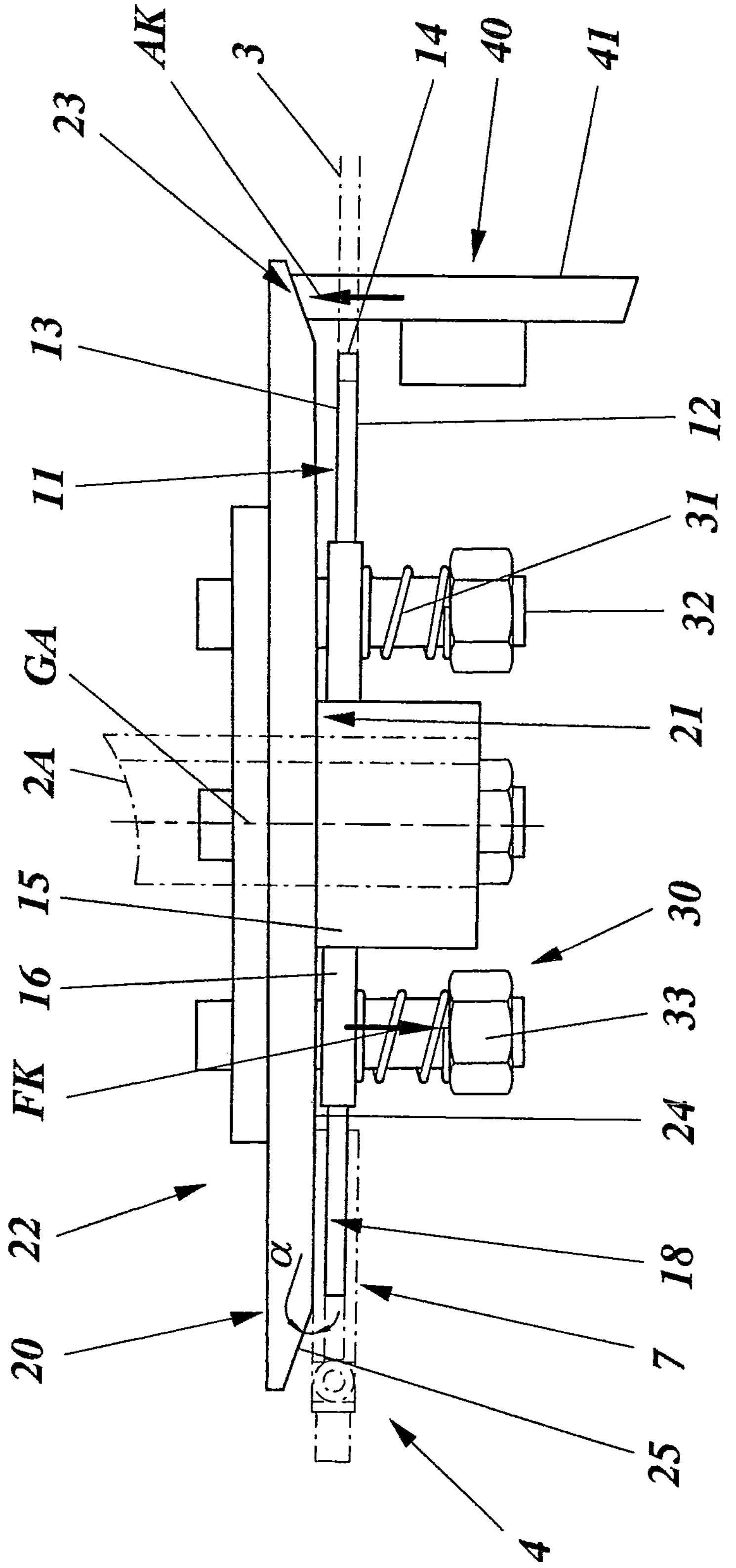
FIG. 3 is a detailed view from above of the drive transmission according to FIG. 2.
Figure 4:
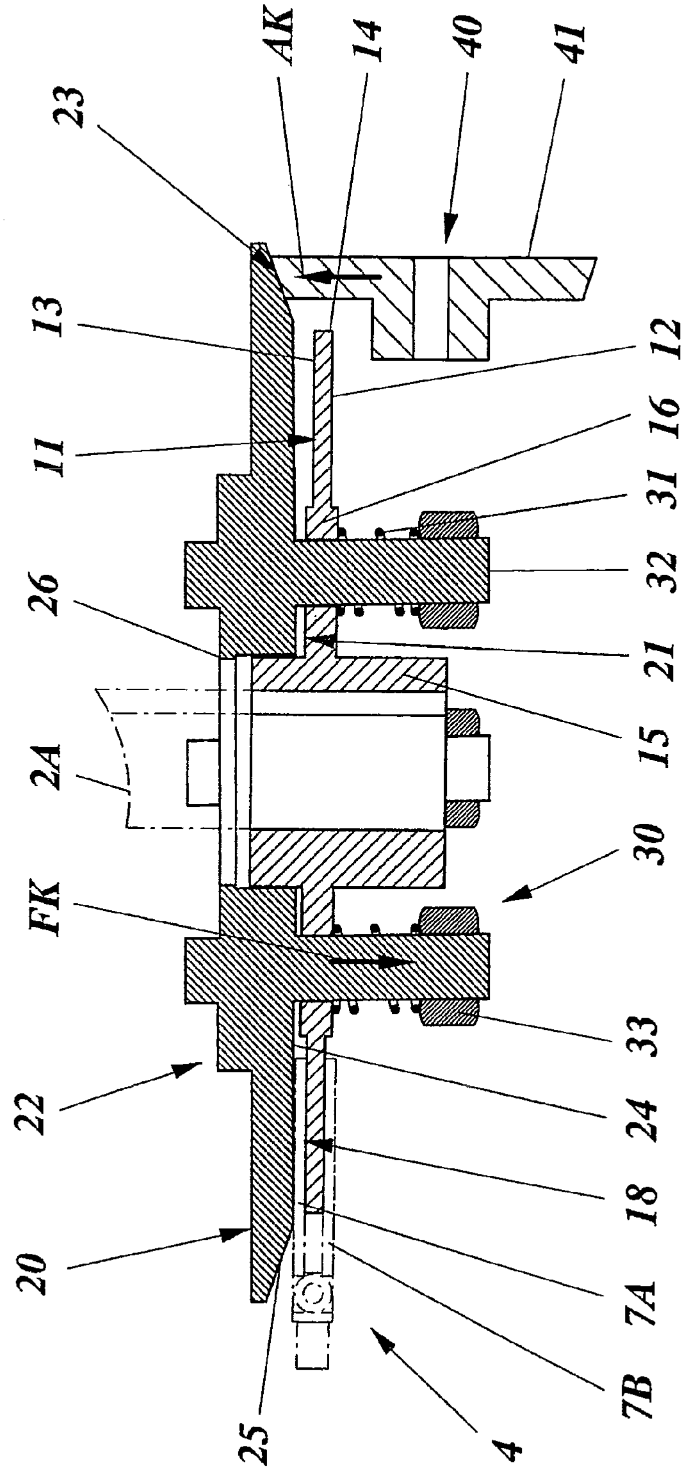
FIG. 4 shows details of the drive transmission of FIG. 2 in a section along line of FIG. 2.
Figure 5:
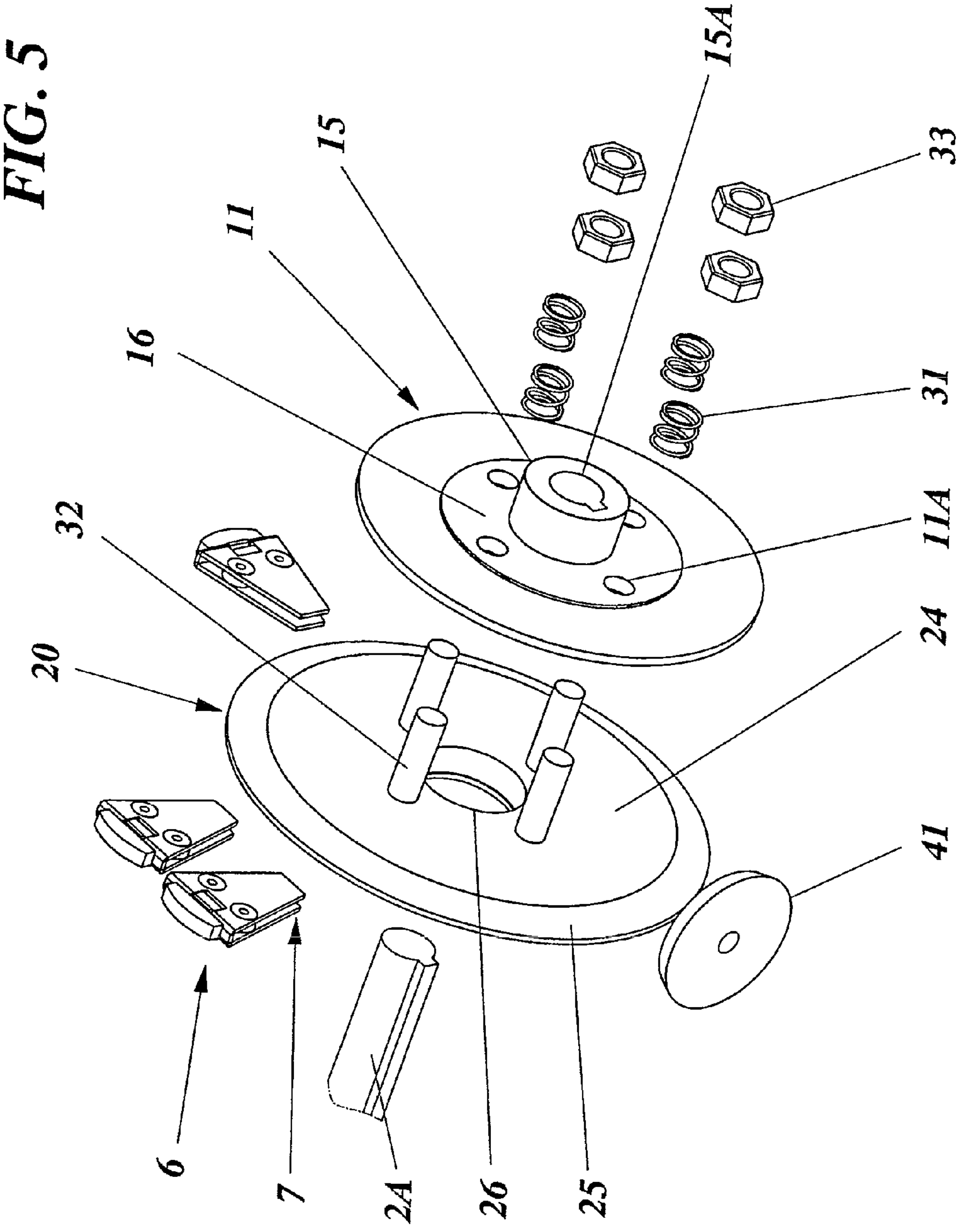
FIG. 5 is an exploded view illustrating the details included in the drive transmission according to FIGS. 2 and 3.
Figure 6:
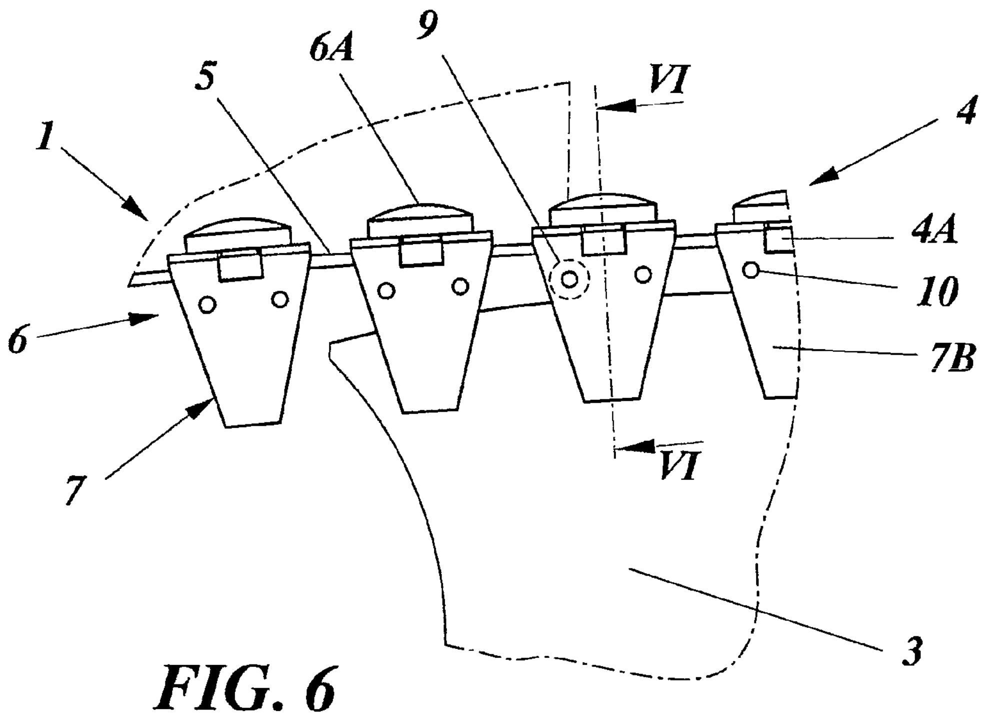
FIG. 6 is a partial side view of the saw of FIG. 1, showing details of the cutting member and the guide bar.
Figure 7:
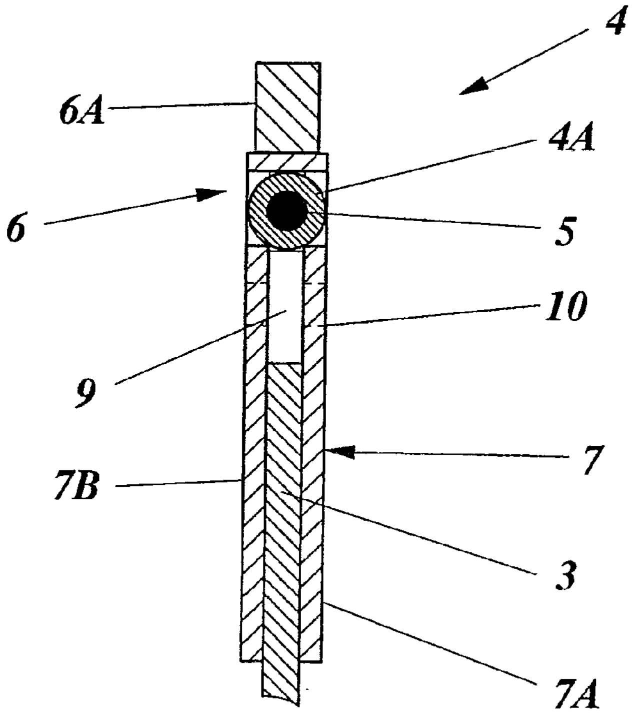
FIG. 7 is a detailed view of a portion of a cutting member and of the guide bar of the saw according to FIG. 1, in a section along line VI-VI of FIG. 6.
Figure 8:
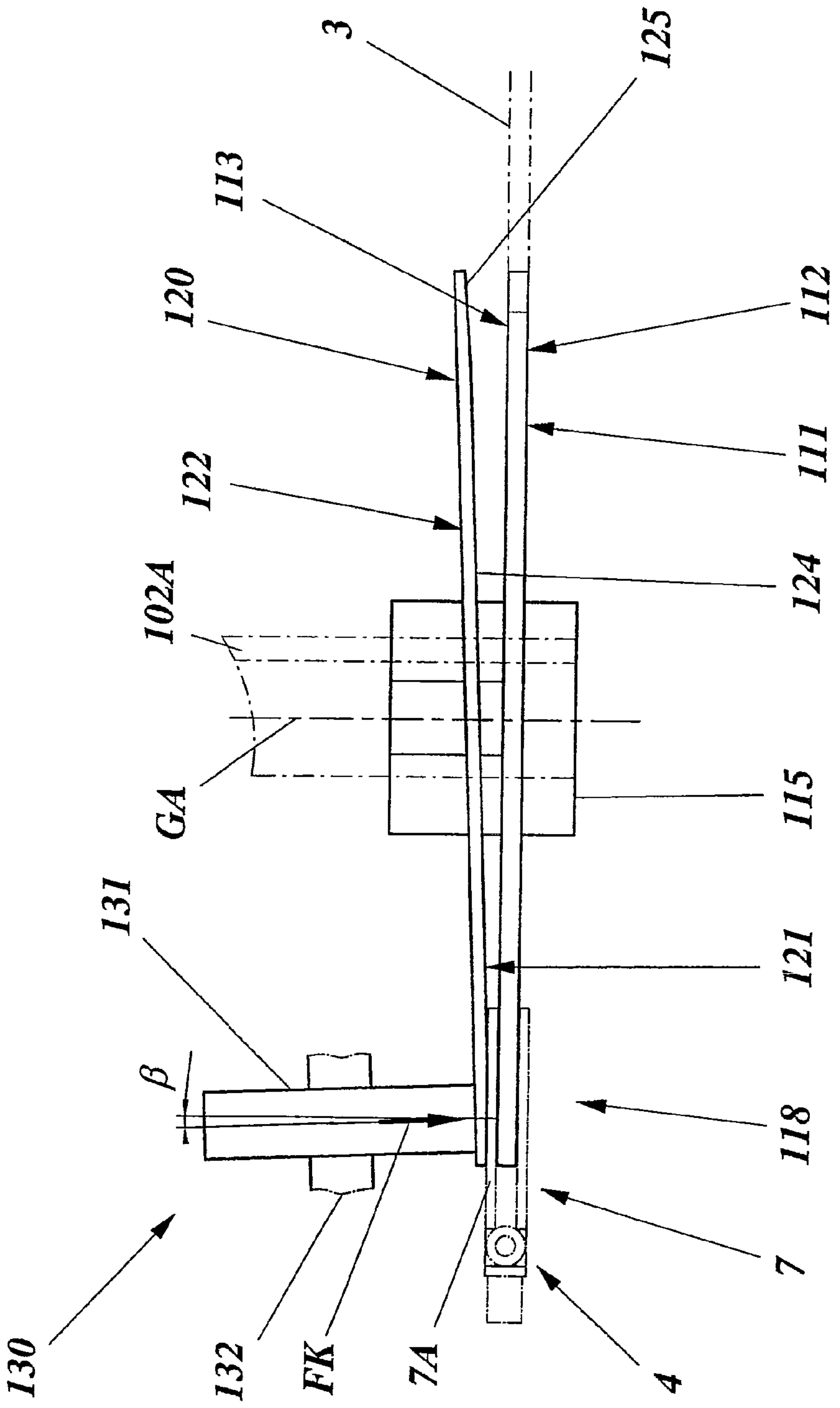
FIG. 8 is a view similar to that of FIG. 3 of a second embodiment of the inventive drive transmission.

As was mentioned, in this design the clamping member 20 is angled/beveled outwardly, the angle $\alpha$ in FIG. 3, away from the drive member at a radially outer surface 25. The purpose of this angle $\alpha$ is to facilitate the introduction of the rider members 7 of the cutting member 4 between the drive member 11 and the clamping member 20 during operation. In certain applications the drive surface 24 of the clamping member 20 that faces the drive member 11, or portions thereof, might also be angled very slightly conically outwardly from the drive member 11, with an angle that is very small, e.g. in the order of 0.1-0.2°, and that is not illustrated in the drawings. By means of such a slightly outwardly angled drive surface 24 the clamping member 20 may in certain cases, in a drive position (see FIG. 3) where it is tilted relative to the drive member 11, be brought into optimal contact with the drive member 11 in a drive or contact area 18 of the transmission assembly 11, 20, or actually into a friction drive contact with the rider members 7 that in operation are introduced there between. However, normally a flat non-angled drive surface 24 is preferred since it brings about the positive quality that the contact point between the clamping member 20 and the rider members 7 of the cutting member 4 is thereby displaced radially outwardly when the clamping member 20 is tilted, which improves the stability of the cutting element carriers 6 since the contact point comes closer to the "floating" support of the cutting element carriers 6 on the wire 5. Thereby the breaking or shearing forces that act on the rider members 7 are reduced.

The tilted position of the clamping member 20 relative to the drive member 11 is in this design accomplished by means of a relieving means 40 that is provided for applying an axial relieving-force AK against the clamping member 20 in a relieving area 23 of the transmission assembly 11, 20, said area 23 being closest to the saw guide bar 3. As was mentioned, the clamping member 20 is journalled for movement axially towards and away from as well as for tilting relative to the drive member 11. This relative movement is enabled by the fact that the hub 15 of the drive member 11 with an appropriate play is received in a central recess 26 in the clamping member 20 as well as by the fact that the pins 32 of the biasing means 30, which are firmly connected to the clamping member, pass with play through the holes 11A of the drive member 11. By the provision of the central recess 26 in the clamping member 20 the drive shaft 2A of the motor 2 extends freely therethrough, as is evident from especially FIG. 4.

In this embodiment the relieving means 40 consists of a running roller 41 being supported freely rotatable at a frame 1A (FIG. 2) of the saw 1 and mounted substantially perpendicular to the plane of the drive 11 and clamping 20 members, engaging the outer angled edge surface 25 of the clamping member 20 in the transmission assembly 11, 20 relieving area 23. The running roller 41 is preferably angled at its outer periphery for adaption to the tilting of the clamping member 20 and to its angled edge surface 25, respectively. The running roller 41 requires no special drive but rotates along by the friction against the axially movable biased clamping member 20. The running roller is preferably adjustable in its radial direction (not shown in detail). When operating the saw 1, the running roller 41 thus runs continuously against the clamping member 20 at a position preferably radially just inside the outer circumference thereof. To apply the axial relieving force AK that brings about tilting of the clamping member 20, the running roller 41 contact point with the clamping member, i.e. its outer periphery, is also axially displaced from the plane of the drive member 11, in a direction opposite to the direction of action of the biasing means 30.

The described transmission assembly 11, 20 is adapted for cooperation with a cutting member 4 that according to the invention comprises rider members 7 having substantially parallel guide and drive portions 7A, 7B (FIG. 7) that, with the cutting member 4 mounted on the saw 1, extend downwardly from the cutting element carriers 6, in a direction towards the saw guide bar 3, and the mutual spacing of which is slightly larger than the thickness of the saw guide bar 3 for providing a guiding cooperation with the saw guide bar 3, at both of its sides. Thus, the guide and drive portions 7A, 7B are also separated in the axial direction of the drive member 11, with a distance essentially corresponding to the thickness of the drive member 11, so that in the operating condition they straddle the drive member with a certain, small play to guidingly cooperate also with this. The separated guide and drive portions 7A, 7B have such a length that in the assembled condition in the saw 1 they protrude down a substantial distance past the outer periphery of the saw guide bar 3, as well as above all past the periphery of the drive member 11 and of the clamping member 20. In a design being advantageous for the manufacturing, the cutting element carriers 6 are preferably made integral with the rider members 7 and consist of plate-like material. Cutting members 4 of this type do in addition to the guiding rider members 7 also have support or contact elements 9 for direct supporting contact with the cutting member supporting portion 3. In a preferred inventive design of the cutting member 4 the cutting element carriers 6 have rolls 9 for direct supporting contact with the guide bar 3, said rolls being supported freely rotatable in bores 10 in the cutting element carriers, in a manner not specifically shown.

As was mentioned, the relieving force AK of the relieving means 40 acting against the clamping member 20 causes tilting of the clamping member 20 relative to the drive member 11 and thus separation of the clamping member 20 and the drive member 11 in connection with the relieving area 23. The contact between these elements 11, 20 is thus concentrated to the contact area 18 of the saw that is remote from the relieving area 23 where the force AK is applied. Through this tilting the drive member 11 and the clamping member 20 are brought into friction drive contact with the rider members 7 of the cutting member 4. This is done such that the transmission of drive force to the cutting member 4 will take place in the contact area 18, through the rider members 7. The driver members 7 are, with a guide and drive portion 7A thereof, freely introduced between the drive member 11 and the clamping member 20 in the relieving area 23 where the drive and clamping members are separated and are then, during continued operation, clamped between the drive member 11 and the clamping member 20 in the contact area 18.

The described design according to the invention, wherein the clamping member 20, which is supported coaxially and rotationally fixed to the drive member 11, is axially movable towards and away from and tiltable relative to the drive member 11, provides a very advantageous method of driving a cutting member 4 in a saw 1 for cutting harder materials. This is done by the fact that the drive force of the drive motor 2 is here first transmitted to the drive member 11 and then, by the biasing force FK applied by the biasing means 30 and acting between the drive surface 24 of the clamping member 20 and the side 13 of the drive member 11, to the cutting member. The application of the biasing force FK between the drive and clamping members 11 and 20, respectively, which together form the transmission assembly, causes this force FK to bias at least portions of the drive and clamping members 11 and 20, respectively, against each other for cooperation with one of the drive portions 7A of the rider members 7 that during operation of the saw 1 are successively introduced between the drive member 11 and clamping member 20. Thereby, drive force is transmitted through friction drive, and thus with an upper load limit, from the drive motor 2 to the rider members 7 and through them to the cutting member 4. As a result thereof the friction drive also functions as an overload slip coupling. This counteracts wire break and overload damages to the cutting member 4 as well as to the motor 2. Not least does this slip function also increase user safety, since kickbacks and violent jerks are eliminated. Preferably the size of the biasing force FK of the transmission assembly 11, 20 is adjustable for adaption to different operating conditions. Said adjustment may be easily provided by e.g. loading the springs 31 by means of nuts 33 provided on the pins or bolts 32 onto which the springs are passed.

The application of the relieving force AK against the clamping member 20 in the relieving area 23 that is located substantially opposite the cutting member supporting portion 3 does, through the tilting of the clamping member 20, cause the contact between this and the drive member 11, or actually the rider members 7 introduced there between, in friction drive contact with the latter, to be concentrated to the engagement area 18 that is remote from the relieving area 23. The function of the roller 41 is simultaneously to push away the spring loaded clamping member 20 so that the rider members 7 of the cutting element carriers 6 may be securely introduced into and removed from, respectively, the friction drive. In particular, the separation of the clamping member 20 and the drive member 11 in the relieving area 23, in combination with the outwardly angled outer surface 25 of the clamping member 20, results in that one of the drive portions 7A of the rider members 7 may without problems, i.e. without any risk of getting stuck, be introduced between the drive and clamping members and may exit therefrom at the opposite side of the drive transmission 11, 20.

Compared to conventional drive arrangements the invention provides an essential improvement for saws in general and for saws for cutting harder materials in particular. The advantages basically consist of the discussed improvement that involves the fact that by frictionally driving the cutting member that is provided with spaced links or cutting element carriers, driving thereof may be performed independently of any fixed, exact pitch between the carriers. The distance between the cutting element carriers is thus of no or of essentially smaller importance than if the drive/driving is fixed and is performed e.g. through a chain and sprocket having a fixed pitch. This means that manufacture of the cutting member may be simplified and more economical and also that the load on and wear of the drive transmission as well as of the cutting member may be significantly reduced. Furthermore, an advantage is also obtained in the form of an overload protection that prevents or at least counteracts wire break and damage to the cutting member and the motor as well as also personal injuries.

Other advantages of the invention consist in that the direction of rotation of the cutting member may be optionally reversed so that the saw is easily turned around to admit inverted cutting. By changing the direction of rotation, and at the same time turning the entire saw 180 degrees, the saw will be changed from a left-hand to a right-hand saw. This is advantageous for left-handed and right-handed operators. It is likewise advantageous when cutting is to be done adjacent a corner. Depending upon whether the hindering wall is on the right or the left side, the saw is turned so that it will be possible to cut close to the corner/obstacle. Saws lacking this quality have caused accidents when the operator has turned the saw to obtain the desired result and thereby has operated the saw in a manner for which it was not intended. The result has been that the saw has "got stuck" and kicked-back, with resulting operator injuries.

FIGS. 8-11B show an alternative, second embodiment of the invention that is presently preferred, mainly for reasons of manufacture. Like before, the transmission assembly 111, 120 has a drive member 111 being stationary but rotatably journalled in the saw and being connected, rotationally fixed, to a schematically illustrated drive shaft 102A from the drive motor. This drive member 111 does in cooperation with a clamping member 120 transmit drive force from the drive motor to the cutting member 4 through one 7A of the rider member 7 drive portions. The drive member 111 with its flat sides 112, 113 essentially corresponds to that of the first embodiment, but differs therefrom by the fact that it lacks the thickened portion and the through holes therein.

In the illustrated basic design where the clamping member 120, like in the first embodiment, is coupled rotationally fixed to the drive member 111, the drive member 111 hub 115 is also, at least at the part where the clamping member 120 is supported, designed having an outer contour 117 that is not rotationally symmetrical and that is intended for cooperation, with play, with an opening 126 in the centre of the clamping member 120 that is complementary thereto as far as the shape is concerned (see especially FIG. 11B). For simplicity, these complementary shapes are here shown as a general square shape having rounded corners, but is shall be obvious that in practical designs they may be formed by other shapes providing a rotationally fixed connection with play, e.g. a type of spline connection. In certain applications of this embodiment it may also be advantageous not to form any rotationally fixed connection between the drive member 111 and the clamping member 120, but to support the clamping member 120 freely rotatably on the drive member 111 and to cause it to rotate along by means of the biasing force FK that is likewise applied here. Such a modified design is indicated in FIG. 11B by the outlined alternative, rotationally symmetrical shapes of the outer contour 117' of the hub and of the opening 126' of the clamping member.

Like before, the clamping member 120 and the drive member 111 are essentially centered on a common geometrical axis GA and the clamping member 120 is, through the mentioned play, supported on the drive member 111 so as to be axially moveable and tiltable thereon. In this case too, the clamping member 120 has a circular disc shape with a side 121 facing the drive member 111 having a substantially flat surface 124 facing the drive member and an opposite side 122, i.e. a side facing away from the drive member. The clamping member 120, or in particular its surface 124, is in its radially outer area or edge angled or beveled outwardly, away from the drive member for forming a surface 125 that in this embodiment serves as a drive surface and also to perform the tilting of the clamping member 120 in combination with biasing means 130.

In this embodiment tilting of the clamping member 120 as well as biasing thereof against the drive member 111 is brought about by means of a biasing means 130 in the form of a biasing roller 131 that engages the clamping member 120 and that for applying the biasing force FK thereto is biased towards a radially outer area of the clamping member 120 at a contact area 118 in the transmission assembly 111, 120 of the saw. With respect to the drive member 111 this contact area 118 is located substantially diametrically opposite the cutting member supporting portion 3 of the saw. The biasing roller 131 is rotatably supported, preferably freely rotatable, on a shaft 132 that is journalled in the saw in a manner that is appropriate and that is not described any further. In particular, the tilting of the clamping member 120 is in this case brought about by angling the shaft 132 slightly so that the biasing roller 131 is thereby tilted such that the direction of action of its biasing force FK forms a small angle β with a normal to the flat sides 112, 113 of the drive member 111, said angle preferably being between 0 and 5° especially about 0.5-3°, optimally about 1° (see FIG. 8). By beveling the drive surface 125 of the clamping member 120 with an angle α' of the corresponding size and by applying the biasing force FK against the outer side 122 of the clamping member in an area opposite said drive surface 125, the clamping member 120 will be tilted so that the drive surface makes substantially flat contact with the rider member portion 7A, parallel to the side 113 of the drive member 111.

As is shown in the following embodiments, the shaft of the roller does not have to be tilted to provide the same effect. Alternatively it is possible to use e.g. a biasing roller with inclined peripheral surface (FIG. 12A) or a rubber roller with rounded peripheral surface (FIG. 12B).

Figure 9:
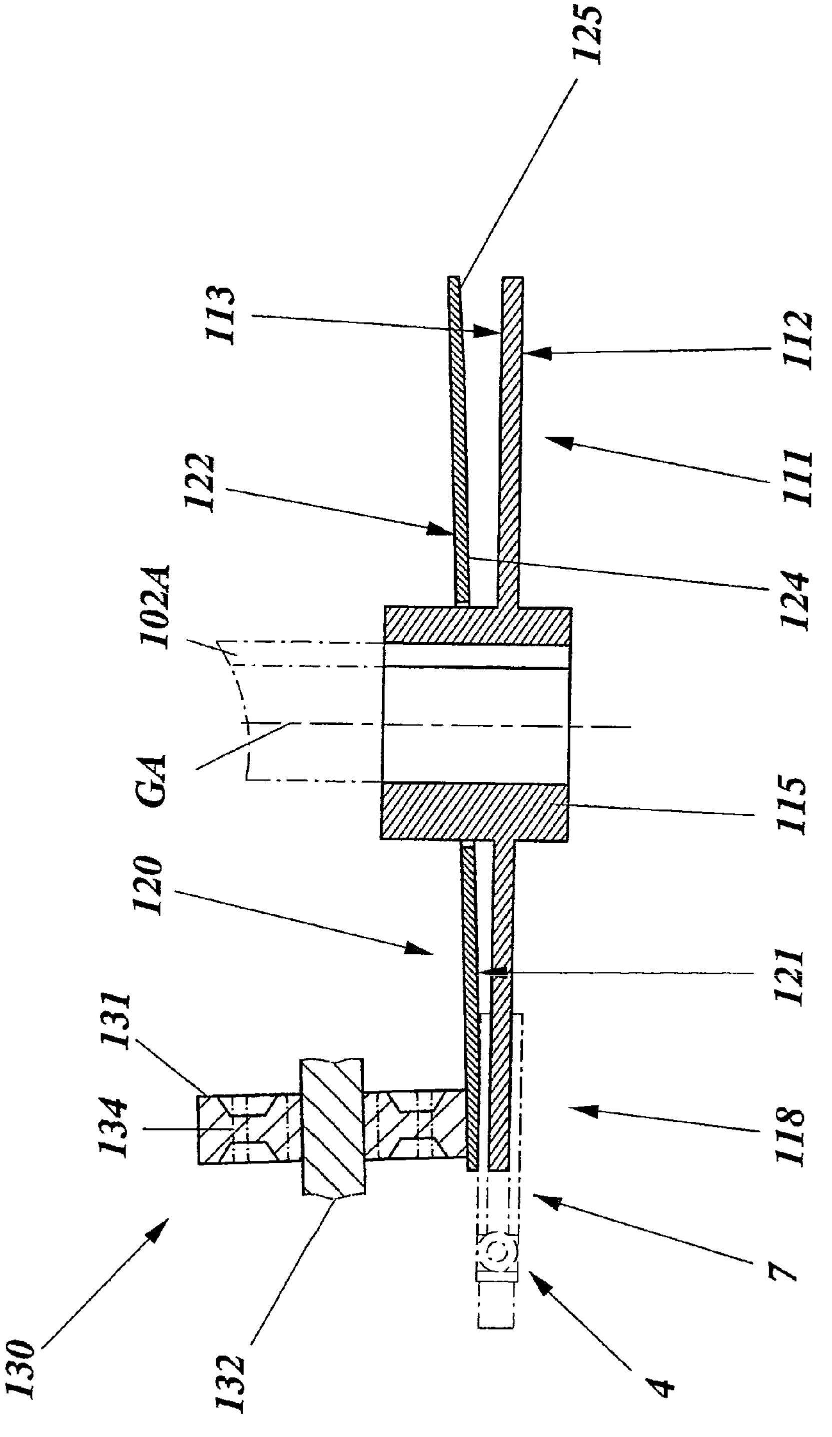
FIG. 9 is a sectioned view of the drive transmission according to FIG. 8.
Figure 10A:
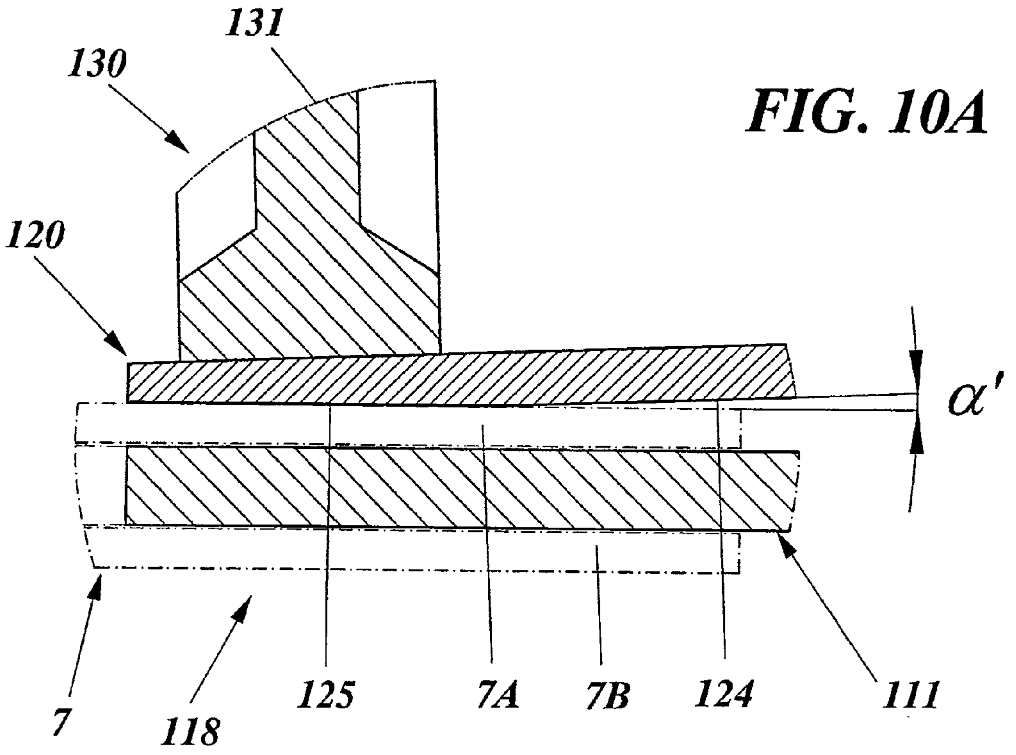
FIG. 10A is a detailed view of FIG. 9 and illustrates the contact area of the clamping and drive members.
Figure 10B:
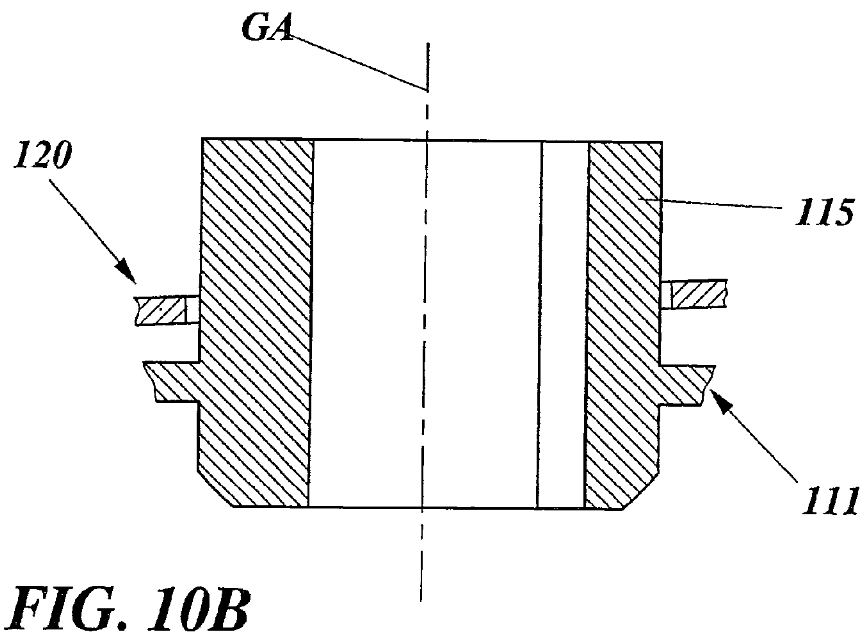
FIG. 10B is a detailed view of FIG. 9 and illustrates the bearing arrangement of the clamping member on the hub of the drive member.

The biasing roller 131 is preferably resiliently and/or adjustably biased against the clamping member 120, whereby the adjustability may preferably be provided by appropriately supporting the shaft 132 in an adjustable position in the saw and the resiliency of the biasing is either provided by an equivalent resilient support of the shaft 132, in a manner not specifically shown, or by supporting the actual biasing roller 131 on the shaft 132 by means of a rubber bushing 134 indicated in FIG. 9. A great advantage of this embodiment is that the biasing means in the form of the biasing roller provides simpler and less expensive manufacturing of the actual biasing means as well as of the drive and clamping members. It also results in a more compact saw in an outward direction from the drive transmission, which increases cutting maneuverability and accessibility.

Figure 12A:
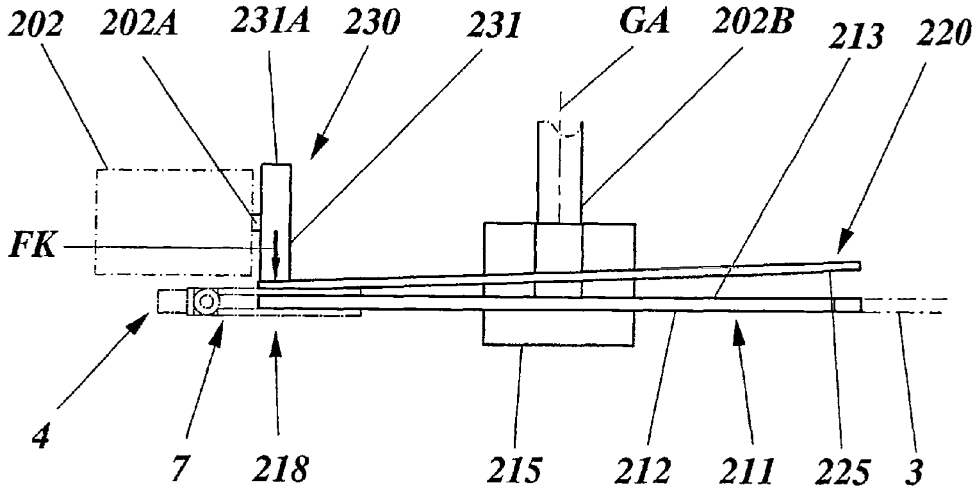
FIG. 12A is a schematical view similar to that of FIG. 3, of a third embodiment of the drive transmission according to the invention.
Figure 12B:
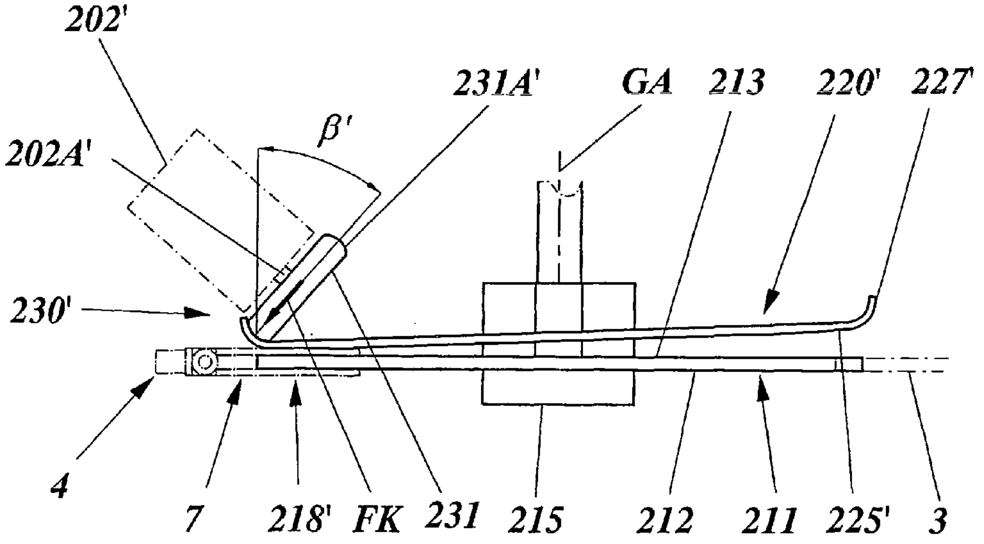
FIG. 12B is a view similar to that of FIG. 12A, of a variant of the third embodiment of the drive transmission according to the invention.

In FIG. 12A is illustrated a third embodiment of the invention, which differs fundamentally from those described before in that the drive member 211, which may otherwise be identical to the one of the second embodiment, is in this case not driven by the drive motor 202 that through its drive shaft 202A instead directly drives a biasing means 230. Said biasing means is in the form of a biasing roller 231 that engages the clamping member 220 and that at the transmission assembly 211, 220 contact area 218 is biased, in a manner not specifically shown, against a radially outer area of the clamping member 220.

To the drive member 211 is attached a shaft 202B that is in turn rotatably supported (not shown in detail) in the saw. Here too, the clamping member 220 and the drive member 211 are essentially centered on a common geometrical axis GA and the clamping member 220 is supported axially movable and tillable on the hub 215 of the drive member 211. Like in the second embodiment a rotationally fixed (here with the clamping member 220 as the driving part) or alternatively mutually freely rotatable support of the clamping member 220 and the drive member 211 may be provided. The clamping member 220 is basically designed as in the second embodiment, having a radially outer drive surface 225 that is correspondingly angled. In this case too the biasing means 230 is in the form of a biasing roller 231 engaging the clamping member 220 to apply biasing force FK thereto at the transmission assembly 211, 220 contact area 218. In this design biasing force FK is applied substantially perpendicularly against the flat sides 212, 213 of the drive member, i.e. coinciding with a normal to said sides, and the peripheral surface 231A of the roller 231 is instead angled for obtaining optimal conditions for the tilting of the clamping member 220. Here, drive force is thus transmitted from the drive motor 202 to the biasing roller 231 and by the biasing force FK, which through the biasing roller 231 is applied to the biasing means 230 and acts between the drive surface 225 of the clamping member 220 and the corresponding side 213 of the drive member 211, further to the cutting member.

In FIG. 12B is shown a variant of the last mentioned design where the clamping member 220' in connection with the radially outer edge of the drive surface 225' is supplemented by an arcuate extension 227' that is preferably formed integral therewith. which The biasing roller 231' of the biasing means 230' is brought into contact with said extension 227' to bias it (biasing force FK) with a likewise arcuate peripheral edge 231A' thereof. The biasing roller 231' that is driven by the drive motor 202' is in this case provided in a position for establishing good contact with the arcuate shape of the extension 217' and an advantageous direction of action of its biasing force FK. In practical designs this may preferably mean that it is tilted such that said direction of action forms an angle β' of between substantially 0 and 60°, preferably about 45°, with the normal to the flat sides 212, 213 of the drive member 211.

It shall be emphasized that in the designs according to FIGS. 12A and 12B the drive motor 202, 202' arrangement is only illustrated very schematically and that in a practical application it may have another positioning that is appropriate for the saw in question and where the biasing roller 231, 231' is driven directly or in the applicable case through a transmission. Like in the embodiment of FIGS. 8-11B the biasing means may, in an appropriate, not illustrated manner be adjustably and/or resiliently biased against the clamping member 220, 220' of the drive transmission by adjustably/resiliently supporting the drive motor 202, 202' and/or resiliently supporting the biasing roller 231, 231' by means of e.g. a rubber bushing.

Figure 13:
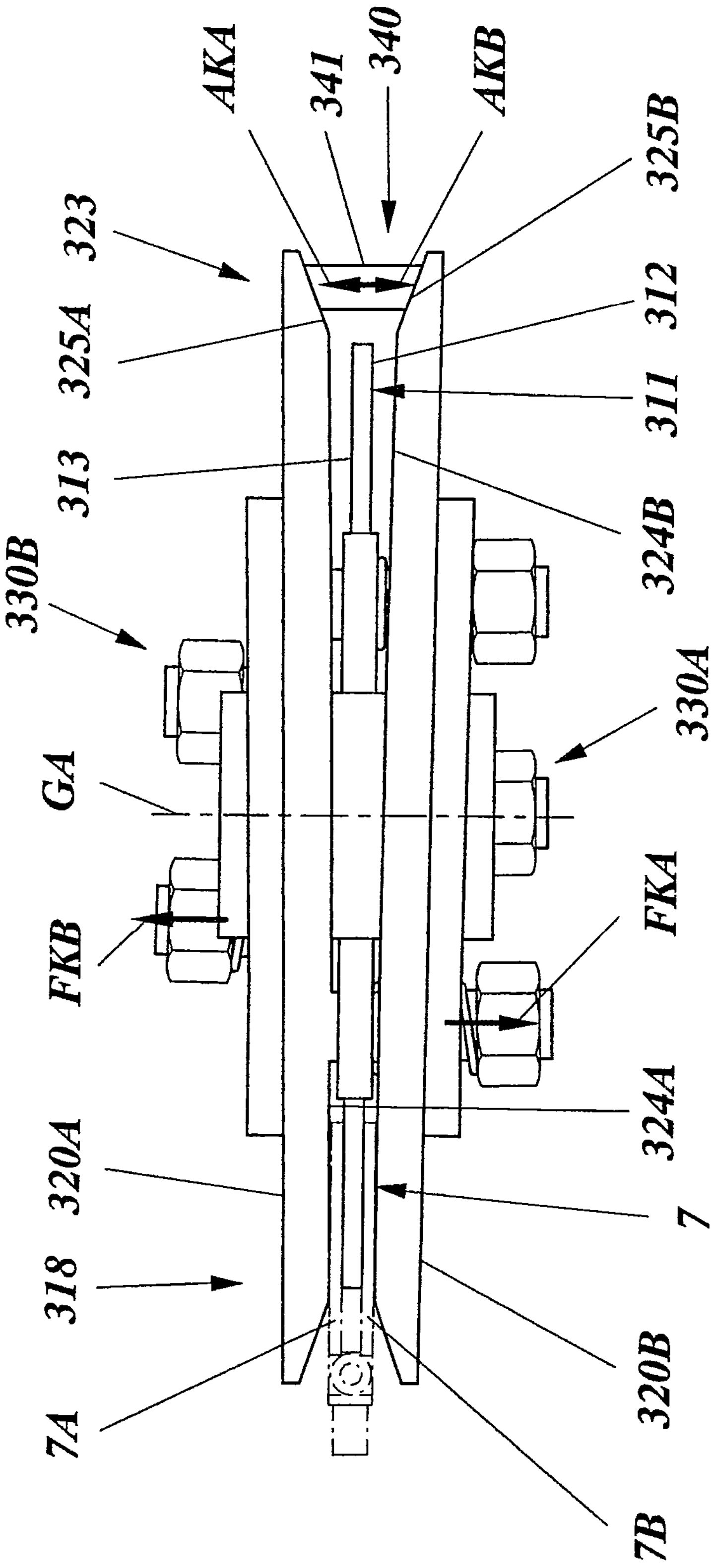
FIG. 13 is a view from above, similar to that of FIG. 3, of a variant of the first embodiment of the drive transmission according to the invention, as illustrated in FIGS. 1-7.

A variant of the embodiment illustrated in FIGS. 1-7 is the use of two clamping members 320A, 320B being connected in a rotationally fixed manner to the drive member 311, being provided at the respective side 312, 313 thereof and each being biased against the drive member 311 with a biasing force FKA, FKB, as is illustrated very schematically in FIG. 13. In this case the biasing force is applied in a manner essentially corresponding to that of the embodiment according to FIGS. 1-7 by applying the biasing force FKA, FKB for the respective clamping member by the biasing means 330A, 330B and substantially evenly distributed around the drive member 311 and the clamping members 320A, 320B. The difference is that in this case one set of the biasing means is provided for each clamping member 320A, 320B. The clamping members 320A, 320B are further displaced/tilted by a common relieving means 340 having a running roller 341 that applies an axial, with regard to the drive member 311, relieving force AKA, AKB against the respective clamping member 320A, 320B in order to, jointly with the drive member 311, get into and out of, respectively, driving contact with the respective guide and drive portion 7A, 7B of the rider members 7 with their respective drive surface 324A, 324B. In this case each clamping member may preferably have a radially outer chamfer or bevel 325A, 325B facing the drive member. This embodiment may in particular be put to practical use in conditions where very large cutting forces are to be transmitted from the drive motor to the cutting member.

In alternative embodiments of the invention variations of the transmission assembly and the parts of the cutting member cooperating therewith may be employed without deviating from the scope of the invention. For the contact between the cutting member and the saw guide bar the use of rolls, preferably of metal, has further been described, said rolls being slidingly supported in the cutting element carriers and rolling around a metal guide bar. In other solutions, not shown, it is theoretically conceivable to omit the rolls and to simply apply a slide layer surface treatment to the saw guide bar and to the underside of the segments. In case it is feasible to omit the rolls in this manner, an essentially less expensive solution is achieved. However, said solution will require special qualities for the slide layers that with such a solution will be exposed to the water and concrete mixture that is formed during concrete cutting. It has also been indicated above, that a wire is employed as a carrying unit for the cutting member. It shall be emphasized that this shall not restrict the invention to the use of a traditional steel wire as a carrying unit for the cutting member, but that other appropriate, presently available as well as future materials may be used, such as Kevlar® or other polymers. Although it is preferable in most applications that the drive member also in the variant where the clamping member is directly driven is rotatably journalled in the saw, it falls within the scope of the inventions to provide the drive member completely fixed in the saw instead. The basic principles of the invention are not restricted to applications with the illustrated type of saw for harder materials either, but may preferably be employed by other types of presently available as well as future saws. Thus, these basic principles of the invention may be used by any type of practically suitable saw.

The invention has been described in connection with what is presently regarded as the most practical and preferred embodiments, but it shall be realized that the invention is not restricted to the illustrated and described designs. As an example, details and features may be freely combined among the different illustrated and described embodiments, without deviating from the scope of the invention. Thus the invention shall cover different modifications and equivalent arrangements falling within the basic idea and scope of the accompanying claims.

The invention claimed is:

1. A method for transmitting, in a saw for cutting hard materials, such as stone and concrete etc., drive force from a drive motor to a cutting member the free ends of which are interconnected for forming an endless unit consisting of cutting element carriers that are supported on a carrying unit, that are connected to cutting elements and that engage a cutting member supporting portion of the saw, in particular a saw guide bar, whereby drive force from the drive motor is transmitted to a transmission assembly supported in the saw and having a drive member included therein, which engages and transmits the drive force to the cutting member through rider members at the carrier units, wherein:

at least one clamping member is supported for rotation in the saw;

portions of the rider members are successively introduced between the drive member and clamping member/members during operation of the saw;

a force is applied between drive member and clamping member for biasing at least portions thereof towards each other and towards said portions of the rider members that are introduced there between; whereby drive force from the drive motor is transmitted to the rider members and thereby to the cutting member through friction drive and thereby with an upper load limit.

2. A method according to claim 1, wherein the method further comprises essentially centering the clamping member/members and the drive member on a common geometrical axis and by supporting the clamping member/members for movement axially towards and away from and for tilting relative to the drive member and by applying to them a biasing force in a direction towards the drive member.

3. A method according to claim 1, wherein through a biasing roller the biasing force is applied to the clamping member at a contact area of the transmission assembly of the saw that with respect to the drive member is located substantially diametrically opposite the cutting member supporting portion of the saw.

4. A method according to claim 3, clamping member is tilted in relation to the drive member by angling or beveling a radially outer edge of the clamping member outwardly, away from the drive member, forming a drive surface facing the drive member, and by applying the biasing force in the area of this drive surface.

5. A method according to claim 3, wherein drive force from the drive motor is transmitted to the biasing roller and through the biasing force applied between the clamping member and the drive member by the biasing roller is transmitted to the cutting member.

6. A method according to claim 1, wherein drive force from the drive motor is transmitted to the drive member and through the biasing force between clamping member and drive member is transmitted to the cutting member.

7. A method according to claim 1, wherein the biasing force is applied against the clamping member/members by biasing means and substantially evenly distributed around the drive member and the clamping member/members.

8. A method according to claim 1, wherein a relieving force is applied to the clamping member/members in a relieving area of the transmission assembly of the saw that is located substantially opposite its cutting member supporting portion, whereby the relieving force is applied in a direction for tilting the clamping member/members relative to the drive member and thereby separation of the clamping member/members and drive members in the relieving area, whereby engagement between said members is concentrated to a contact area in the transmission assembly of the saw that is remote from the relieving area.

9. A saw for cutting hard materials, such as stone and concrete etc., having a drive motor, a transmission assembly for transmitting drive force from the drive motor to a cutting member, a cutting member supporting portion, in particular a saw guide bar, and a cutting member having free ends connected to each other for forming an endless unit and consisting of a carrying unit carrying cutting element carriers that engage the cutting member supporting portion of the saw, whereby the transmission assembly contains a drive member for transmitting drive force from the drive motor to the cutting member through rider members at the cutting element carriers, wherein the transmission assembly comprises:

at least one clamping member rotatably journalled in the saw; and biasing means for applying a biasing force between drive member and clamping member for biasing at least portions thereof in a direction towards each other and towards portions of the rider members that are introduceable there between.

10. A saw according to claim 9, wherein the drive member and clamping member/members have a general disc shape and that the clamping member/members is/are provided essentially centered on a common geo-metrical axis with the drive member and by at least one side thereof.

11. A saw according to claim 9, wherein the clamping member/members is/are supported for movement axially towards and away from and tillable relative to the drive member, that the drive member is supported stationary but rotatable and that the biasing means are provided to apply the biasing force to the clamping member/members, in a direction towards the drive member.

12. A saw according to claim 9, characterized by a biasing roller that at a relieving area of the transmission assembly of the saw, which area with respect to the drive member is located substantially diametrically opposite the cutting member supporting portion of the saw, is provided in contact with and biased against the clamping member for applying the biasing force thereto.

13. A saw according to claim 12, that wherein at a radially outer edge thereof the clamping member has a drive surface facing the drive member and being angled or beveled (the angle $\alpha'$) outwardly, away from the drive member and in that the biasing force is applied in the area of this drive surface for tilting the clamping member in relation to the drive member.

14. A saw according to claim 12, wherein the drive motor is drivingly connected to the biasing roller and through the biasing force applied between the clamping member and the drive member by the biasing roller is indirectly drivingly connected to the cutting member.

15. A saw according to claim 9, wherein the drive motor is drivingly connected to the drive member and is drivingly connected to the cutting member through the biasing force applied between the clamping member and the drive member by the biasing means.

16. A saw according to claim 9, wherein for applying the biasing force the biasing means are provided substantially evenly distributed around the drive member and the clamping member/members.

17. A saw according to claim 9, further comprising relieving means for applying axial relieving force against the clamping member/members in a relieving area of the transmission assembly that is located closest to the cutting member supporting portion of the saw, and in that the relieving means acts with its relieving force in a direction for tilting the clamping member/members relative to the drive member and thereby separating said clamping member and drive member in connection with the relieving area, whereby engagement between said members is concentrated to a contact area of the transmission assembly of the saw that is remote from the application of the relieving force in the relieving area.

18. A saw according to claim 9, wherein at a surface thereof that faces the drive member the clamping member/members is/are conically angled (the angle $\alpha$) outwardly, away from the drive member for facilitating the introduction of the portions of the rider members between clamping member and drive member.

19. A transmission assembly for a saw for cutting hard materials, such as stone and concrete etc., according to claim 8, for transmitting drive force from the drive motor to the cutting member through rider members at the cutting element carriers and including a drive member, wherein the drive member has a circular disc shape with essentially flat sides and a non-profiled, essentially even outer peripheral surface, in that the clamping member/members that are biased towards the drive member likewise have a circular disc shape with a side facing the drive member having at least one substantially flat drive surface and in that the biasing means have a direction of action of their biasing force that corresponds to or forms an angle ($\beta$; $\beta'$) with a normal to the flat sides of the drive member.

20. A transmission assembly according to claim 19, wherein the biasing means consists of a freely rotatable or alternatively driven biasing roller that engages the clamping member and is biased against a radially outer area thereof at a contact area of the transmission assembly.

21. A transmission assembly according to claim 20, wherein the clamping member is angled (the angle $\alpha'$) away from the drive member at a drive surface thereof that faces the drive member and is provided at a radially outer edge of the clamping member that corresponds to the transmission assembly contact area.

22. A transmission assembly according to claim 19, wherein the biasing means consist of springs that are substantially evenly distributed around the drive member, by at least one side thereof, and that engage pin-like means extending through the drive member and the associated clamping member.

23. A transmission assembly according to claim 21, further comprising relieving means consisting of a running roller mounted substantially perpendicular to the plane of the clamping member/members, contacting it/them in a first relieving area of the transmission assembly.

24. A cutting member for a saw according to claim 6 being intended for cutting hard materials, such as stone and concrete etc., and having a transmission assembly, for transmitting drive force from the drive motor to a cutting member the transmission number including;

a cutting member supporting portion, in particular a saw guide bar, a cutting member having free ends connected to each other for forming an endless unit;

a carrying unit carrying cutting element carriers that engage the cutting member supporting portion of the saw, whereby the transmission assembly contains a drive member for transmitting drive force from the drive motor to the cutting member through rider members at the cutting element carriers, wherein the transmission assembly comprises:

at least one clamping member rotatably journalled in the saw; and biasing means for applying a biasing force between drive member and clamping member for biasing at least portions thereof in a direction towards each other and towards portions of the rider members that are introduceable there between;

the biasing force applied by the biasing means being substantially evenly distributed around the drive member and the clamping member/members;

the transmission assembly including an elongate carrying unit, the free ends of which are interconnected forming an endless unit and on which are provided cutting element carriers being connected to cutting elements and at least in the assembled condition being firmly connected to a rider member for guidingly engaging the cutting member supporting portion of the saw, in particular the saw guide bar, wherein the rider members have guide and drive portions for guidingly engaging the cutting member supporting portion, which are extended downwardly, i.e. in the assembled condition in the saw in a direction towards its cutting member supporting portion, from the cutting element carriers, at a mutual distance that is slightly larger than the width of the cutting member supporting portion of the saw as well as of the drive member in the transmission assembly.

25. A cutting member according to claim 24 wherein the cutting element carriers have contact elements for direct bearing contact with the cutting member supporting portion, wherein the contact elements are rolls being freely rotatably supported in the cutting element carriers for direct supporting contact with the cutting member supporting portion and with the drive member in the transmission assembly.

* * * * *

UNITED STATES PATENT AND TRADEMARK OFFICE

CERTIFICATE OF CORRECTION

PATENT NO. : 8,707,943 B2
APPLICATION NO. : 13/119369
DATED : April 29, 2014
INVENTOR(S) : Björn Berglund et al.

It is certified that error appears in the above-identified patent and that said Letters Patent is hereby corrected as shown below:

IN THE CLAIMS:

In claim 4, at column 13, line numbered 34, before “clamping member” insert --wherein the--.

In claim 13, at column 14, line numbered 36, after “claim 12,” delete “that”.

Signed and Sealed this
Twenty-first Day of October, 2014

Michelle K. Lee
*Deputy Director of the United States Patent and Trademark Office*